(12) United States Patent
Guimet et al.

(10) Patent No.: US 11,644,103 B2
(45) Date of Patent: May 9, 2023

(54) METAL SEALING SYSTEM FOR TRIPLE ECCENTRICITY BUTTERFLY VALVE

(71) Applicants: COMMISSARIAT A L'ENERGIE ATOMIQUE ET AUX ENERGIES ALTERNATIVES, Paris (FR); TECHNETICS GROUP FRANCE SAS, Saint Etienne (FR)

(72) Inventors: Laurent Guimet, Roche la Moliere (FR); Michel Lefrancois, Saint Etienne (FR); Etienne Boyer, Saint Priest en Jarez (FR); Marin Tessier, Saint Paul Trois Chateaux (FR); Jean-Jacques Darque, Launaguet (FR); Bertrand Thevenon, Villars (FR)

(73) Assignees: COMMISSARIAT A L'ENERGIE ATOMIQUE ET AUX ENERGIES ALTERNATIVES, Paris (FR); TECHNETICS GROUP FRANCE SAS, Saint Etienne (FR)

( * ) Notice: Subject to any disclaimer, the term of this patent is extended or adjusted under 35 U.S.C. 154(b) by 0 days.

(21) Appl. No.: 17/476,044

(22) Filed: Sep. 15, 2021

(65) Prior Publication Data
US 2022/0090685 A1 Mar. 24, 2022

(30) Foreign Application Priority Data
Sep. 24, 2020 (FR) ...................... 2009719

(51) Int. Cl.
*F16K 1/226* (2006.01)
*F16J 15/08* (2006.01)
*F16K 1/228* (2006.01)

(52) U.S. Cl.
CPC ......... *F16K 1/2261* (2013.01); *F16J 15/0887* (2013.01); *F16K 1/226* (2013.01);
(Continued)

(58) Field of Classification Search
CPC ......... F16K 1/2261; F16K 1/226–2266; F16K 1/228; F16J 15/0887
(Continued)

(56) References Cited

U.S. PATENT DOCUMENTS 3,552,407 A * 1/1971 Hirano .................... F16K 1/226
251/307
4,194,749 A * 3/1980 Bonafous ............... F16J 15/322
251/306
(Continued)

FOREIGN PATENT DOCUMENTS

DE 10 2012 103 726 A1 10/2013
FR 2 151 186 4/1973
(Continued)

OTHER PUBLICATIONS

French Preliminary Search Report dated May 20, 2021 in French Application 20 09719 (with English Translation of Categories of Cited Documents), 2 pages.

*Primary Examiner* — John Bastianelli
(74) *Attorney, Agent, or Firm* — Oblon, McClelland, Maier & Neustadt, L.L.P.

(57) ABSTRACT

A metal sealing system for a triple eccentricity butterfly valve includes a dynamic metal seal, having a metal core surrounded by an external coating; a metal case with an external surface that has an inclined conical shape, including a first housing inside which the dynamic metal seal is mounted; a metal cover fixed to the metal case to allow it to close by flush fitting of the upper or lower faces of the metal cover and the metal case, the metal case having a second housing into which the metal cover fits, the dynamic metal seal being located between the metal cover and the surface of the metal case defining the first housing.

10 Claims, 4 Drawing Sheets

(52) U.S. Cl.
CPC ............ *F16K 1/228* (2013.01); *F16K 1/2263* (2013.01); *F16K 1/2266* (2013.01)

(58) Field of Classification Search
USPC ................................................ 251/305–308
See application file for complete search history.

(56) References Cited

U.S. PATENT DOCUMENTS

| | | | |
|---|---|---|---|
| 4,286,769 A * | 9/1981 | Hubertson | F16K 1/2263 |
| | | | 251/306 |
| 7,296,585 B2 * | 11/2007 | Eggleston | F16K 1/222 |
| | | | 137/15.25 |
| 9,121,513 B1 * | 9/2015 | Fan | F16K 1/222 |
| 9,273,789 B2 | 3/2016 | Schmidt et al. | |
| 2007/0215834 A1 | 9/2007 | Helfer et al. | |
| 2013/0056667 A1 * | 3/2013 | Shu | F16K 1/2261 |
| | | | 251/305 |
| 2013/0087734 A1 | 4/2013 | Duboy | |
| 2015/0115190 A1 * | 4/2015 | Fan | F16K 1/226 |
| | | | 251/306 |
| 2018/0266567 A1 | 9/2018 | Hadley et al. | |

FOREIGN PATENT DOCUMENTS

| | | |
|---|---|---|
| FR | 2 228 572 | 12/1974 |
| FR | 2 615 580 A1 | 11/1988 |
| WO | WO 98/04376 A2 | 2/1998 |

\* cited by examiner

METAL SEALING SYSTEM FOR TRIPLE ECCENTRICITY BUTTERFLY VALVE

TECHNICAL FIELD

This invention relates to the field of sealing systems for triple eccentricity butterfly valves, and is more specifically concerned with the valve main sealing system providing "in-line" sealing, namely sealing around the periphery of the disk when the valve is closed.

STATE OF PRIOR ART

U.S. Pat. No. 9,273,789 B2 discloses a typical arrangement of a triple eccentricity butterfly valve. The first eccentricity consists of an offset of the stem relative to the surface of the disk, along the axis of the conduit. This same stem is also offset laterally from the axis of the conduit to obtain the second eccentricity. Finally, the bearing surface of the seal is conical, with a certain angle of inclination that forms the third eccentricity.

This arrangement is well known to an expert in the subject and, when the valve is closed, can simultaneously bring all points of the conical surface of the main seal into contact with the conical sealing surface of the body, subsequently referred to as the "seat". Therefore this arrangement is useful for the user, since he or she must apply almost no torque to the disk before closing. The user only needs to apply a torque after contact has been made to force an intimate contact between the seal and the seat.

Furthermore, in this U.S. Pat. No. 9,273,789 B2, the seal is mounted on the disk (mobile), and the seat is on the valve body (fixed). The seal then has a "male" conical shape and the seat has a "female" conical shape. However, it is quite possible to install the seal in the fixed part—it will then have a female conical shape—and the seat can be on the disk that will then have a male conical shape.

However, manufacturing and development constraints are very real for the valve manufacturer. If the arrangement is to function optimally, the conical surfaces of the seal and the seat must fit perfectly. This includes three aspects in particular: 1) the seal must have a lateral degree of freedom in order to be in the right position—the optimal kinematics imposed by this type of construction is disturbed by the different manufacturing tolerances of the assembly, and therefore it is important to allow the system to self-adjust; 2) the geometries of the conical parts must be as precise as possible; 3) the geometries of the conical parts must not deform over time, for example during temperature rises.

Despite all this, the concept of a "perfect fit" remains difficult to apply, and is not much used by an expert in the subject. The male and female conical parts cannot be strictly topologically identical. If the male cone is very slightly smaller than the female cone, at the end of the closure there will be a more or less extended field of openings between the two surfaces, and the sealing function will in fact be very much deteriorated.

The response of the expert in the subject to this problem will lie in the method of tolerancing the two conical surfaces. He or she will create some interference, particular in penetration of the male cone into the female cone or vice versa, to ensure the absence of a field of openings. This works, but the simultaneous contact of all points of the male conical surface on the female conical surface is lost. A kinematic study shows that contact will be made firstly in the areas closest to the valve operating axis, a few degrees before the end of closure; it will then spread progressively to areas furthest from said valve operating axis. Therefore there will be a slight amount of torque during the final degrees of closing.

Therefore it will be understood that potentially very rigid conical joints will eventually have to be used that are therefore not very conducive to surface-to-surface accommodation which would be beneficial for sealing, in favour of a finally small gain in the reduction of operating torques.

The rigidity of conical seals can be reduced by replacing a single-piece metal conical seal with a lamellar seal, composed of a stack of graphite and metal strips, for example visible in FIG. 4 of U.S. Pat. No. 9,273,789 B2 described above. However, the final gain in flexibility remains quite small. It should also be noted that this type of construction may not be applicable, particularly in applications for which graphite is not compatible. Wear of the graphite component over time is also a problem, since graphite is quite friable and therefore highly likely to erode in service.

Outside the technical field of triple eccentricity butterfly valves, it can be seen that it is customary to work with different metal sealing solutions. For example, French patent application FR 2 615 580 A1 presents an interesting solution for double eccentricity butterfly valves. As a reminder, in this construction, the shape of the sealing surface is conical or radiated, but in any case without inclination (with reference to U.S. Pat. No. 9,273,789 B2, this means that there is no longer the inclination angle mentioned above). Sealing is made by the principle of a metal C-ring with a spring core: this is a special design of a metal C-ring with a spring core, for example such as the HELICOFLEX® seal marketed by the French Technetics Group company, the basic principle of which is itself explicitly described in French patent application FR 2 151 186 A1. The seal comprises two toruses: a dynamic torus that the disk will compress at each closure and a static torus that makes the seal between the interior of the conduit and the external environment. A sealing membrane makes the connection between the two toruses. This membrane is in fact the continuity of the sealing coatings of the two toruses. This solution has good performances for double eccentricity butterfly valves for sealing pressures of up to 70 bar.

The adaptation of this concept to triple eccentricity butterfly valves can thus legitimately to be questioned. A geometric difficulty is then encountered. On a double eccentricity configuration, the contact surface of the torus is located in a plane perpendicular to the axis of the conduit. In this plane, the contact surface is circular in shape: a circle is obtained by the intersection of a cone or another surface of revolution with a plane orthogonal to the axis of this cone or other surface of revolution. Therefore, in the same manner, the general shape of the seal is circular. On a triple eccentricity butterfly valve, the contact surface of the seal is located on a plane perpendicular to the axis of the conduit, in exactly the same manner. On the other hand, the axis of the conical contact surface is inclined relative to the axis of the conduit. Therefore the intersection of the cone and the plane is an ellipse. Therefore the double seal proposed in French patent application FR 2 615 580 A1 should have a generally elliptical shape. This introduces a significant complexity. In terms of manufacturing, all the plates forming the seal must be deformed by elliptical stamping tools, which are costly and require complex machining. Another alternative could be the initial manufacture of a circular seal, which would then be deformed into an elliptical shape. This is impossible in practice, because the sealing membrane in fact gives a very high axisymmetric stiffness to the assembly, preventing general deformation of the structure of the seal.

European patent application EP 2 228 572 A1 discloses a different metal sealing solution. In this application, a seal support compresses a secondary seal mounted on the disk. This seal support comprises a housing that will house a seal, such as a metal O-ring or even a C-ring. However, this application EP 2 228 572 A1 does not disclose how to simultaneously make a correct seal between the seal and the seat, and between the seal and its support, using such a seal. The proposed C-shape cannot ensure this double sealing function. The C-shaped metal seal should be compressed axially between the seal support and the cover, and would then have an oblong shape in the radial direction, with uncertain regularity around the circumference (depending on local tolerances). Therefore, control of the seal/seat interference is not disclosed. However, an expert in the subject knows that this is one of the main principles of reliability for this type of application (control of the valve operating torque, optimisation of the resistance in friction, optimisation of the leakage rate, etc.). In addition, in this application EP 2 228 572 A1, the seal that fits in the seal support housing is trapped between the seal support and the clamping ring. This type of construction introduces many difficulties with handling and assembly, particularly for correct positioning of the seal so that it can perform its function optimally. Maintenance operations, including replacement of the seal, are complicated by this construction.

In addition, a system with an elastomer O-ring seal on a seat has been disclosed in international application WO 98/04376 A2. Interference-control considerations are less important, given the natural flexibility of an elastomer. On the other hand the use of this concept with a metal seal is not obvious. The question of how to define the groove and the seal arises, so as to obtain an ideal interference over the entire contact surface of the seat and also to limit the risk of the disk getting jammed, because of the excessive stiffness of the case/seal assembly. Typically, replacing an elastomer O-ring with a metal O-ring in this application without further consideration would probably cause jamming of the valve because the assembly would be too rigid.

As a result, there is a need to disclose a solution for a metal seal, giving better performances than conventional sealing solutions for triple eccentricity butterfly valves, and easily adapting to the elliptical nature of the contact surface. This solution should make it possible to optimise sealing parameters, the service life and the operating torque.

PRESENTATION OF THE INVENTION

The purpose of the invention is to at least partially remedy the needs mentioned above and the disadvantages in embodiments according to prior art.

Another purpose of one of the aspects of the invention is a metal sealing system for a triple eccentricity butterfly valve, comprising:
  a dynamic metal seal, preferably comprising a metal core surrounded by an external coating,
  a metal case with an inclined conical external surface, comprising a first housing inside which the dynamic metal seal is mounted,
  a metal cover, attached to the metal case to allow it to close by flush fitting of the upper or lower faces of the metal cover and the metal case, the metal case comprising a second housing into which the metal cover fits, the dynamic metal seal being located between the metal cover and the surface of the metal case defining the first housing.

Another purpose according to one of the aspects of the invention is a triple eccentricity butterfly valve, comprising:
  a valve body defining a conduit, and comprising an inclined conical part forming the valve seat,
  a valve stem guided in rotation on each side of the conduit, connected to a butterfly valve control rod,
  a disk rotating simultaneously with the valve stem, housed in the conduit of the valve body,
characterised in that it also comprises a metal sealing system fitted in the disk, or in the valve body, bearing by crushing on a secondary seal that makes the seal between the metal sealing system and the disk or the valve body, and of which an inclined external or internal conical part respectively, makes the seal with the valve seat or the disk, respectively, and in that the said case is in contact with the secondary seal.

The metal sealing system can indifferently be fitted in the valve body or in the disk. Advantageously, the metal sealing system has a capacity for radial accommodation and does not deform due to axial bearing on the secondary seal during installation on the disk or on the valve body.

The metal sealing system and the butterfly valve according to the invention may also comprise one or several of the following characteristics taken in isolation or in any technically possible combination.

The dynamic metal seal may be of different types. In particular, it may be an O-ring or a C-ring, among others. The dynamic metal seal preferably comprises a metal core surrounded by an external coating, The metal core may be composed of a spring, in particular a coil spring with adjacent turns that is closed on itself and that has the shape of a torus when in the rest state.

The external coating inside which the metal core is inserted, may have the shape of a toroidal surface for which the generating circle does not close on itself, when in the rest state.

In particular, the dynamic metal seal can be a C-seal with a spring core, for example such as the HELICOFLEX® seal marketed by the French Technetics Group company, the basic principle of which is described in French patent application FR 2 151 186 A1.

In addition, the first housing of the metal case may comprise a lateral bearing surface with which the dynamic metal seal is positioned in contact.

The lateral bearing surface may have any shape, in particular a non-circular shape, and in particular configured to obtain a variable interference around the periphery of the sealing system. The shape can thus be defined as desired to obtain a predetermined interference at each point around the periphery of the sealing system.

In particular, the lateral bearing surface may be elliptical. The dynamic metal seal may be circular in shape. It may also be radially compressible to take on an elliptical shape.

In addition, the first housing of the metal case may comprise a lateral bearing surface with which the dynamic metal seal is positioned in contact, the lateral bearing surface being elliptical in shape.

The dynamic metal seal may have a generally elliptical shape, its internal ellipse being substantially identical to the ellipse of the lateral bearing surface (with a slight play or squeezing). Depending on the stiffness of the seal and the difference in dimension between the major and minor axes, it can also be considered that the seal is general circular in shape, its elliptical shape being taken on during installation in the first housing, especially by slight stretching along the major axis. It is then the first housing itself that allows the dynamic seal to maintain its elliptical shape.

Furthermore, the dynamic metal seal may be a "U" shaped seal, with an opening facing the upper or lower face of the case, especially with an opening offset by a maximum angle of 30° from the centre line of the case.

In other words, it is possible to keep a slightly inclined "U" shape. This can be useful, for example, to prevent the ends of the "U" from inappropriately catching on the valve seat when closing, and pushing or wrinkling the coating of the dynamic seal.

The dynamic metal seal may be a "U"-seal.

The coating of the dynamic metal seal may be composed of a single metal, for example nickel. Alternatively, the coating may comprise a rigid part, for example made of stainless steel or Inconel®, on which a flexible deposit is added on the surface only, for example a deposit of silver, polytetrafluoroethylene (PTFE) and/or nickel-PTFE.

In some applications, lower sealing performances may be accommodated, because the valve is likely to make a large number of opening/closing operations and it is desired to limit surface wear. The coating may then comprise a rigid part, for example made of stainless steel or Inconel® that has been surface-hardened, for example by means of a case hardening or surface hardening process such as that called Kolsterising® by Bodycote.

In addition, the dynamic metal seal may comprise a surface texture, so as to increase its ability to create intimate contact with the valve seat.

The metal sealing system can be configured so that it can be fitted in the disk or in the valve body, of a triple eccentricity butterfly valve comprising a valve body defining a conduit, and comprising an inclined conical part forming the valve seat, a valve stem guided in rotation on each side of the conduit, connected to a butterfly valve control rod, and a disk rotating simultaneously with the valve stem. The metal sealing system can bear on a secondary seal, crushing it to make the seal between the metal sealing system and the disk or the valve body, and of which an external or internal inclined conical section respectively provides the seal with the valve seat or the disk respectively, and said case may be in contact with the secondary seal.

The metal sealing system can be configured to be installed in a recess in the disk or in a recess in the valve body.

The disk may comprise a groove housing the secondary seal when the metal sealing system is installed in the disk, or the valve body may comprise a groove housing the secondary seal when the metal sealing system is installed in the valve body.

This groove can be integrated into the case. This alternative has the following advantages: the valve manufacturer can avoid the operation to machine a groove on the disk or on the valve body; the seal manufacturer can have optimum control over machining tolerances of the groove of the secondary seal, which can be a critical point for operation of the seal.

The secondary seal may be a spiral wound gasket or a forged seal, in particular made of graphite.

The metal sealing system can be configured to be fitted in the disk, and the metal sealing system and the secondary seal can be configured to be compressed axially by a flange, attached to the disk by a network of nuts.

BRIEF DESCRIPTION OF THE DRAWINGS

The invention will be better understood after reading the following detailed description of non-limitative example embodiments of the invention, and an examination of the diagrammatic and partial figures in the appended drawing on which.

In all these figures, identical references may designate identical or similar elements.

Furthermore, the different parts shown on the figures are not necessarily all at the same scale, to make the figures more easily understandable.

DETAILED PRESENTATION OF PARTICULAR EMBODIMENTS

Examples of embodiments of the invention will now be described with reference to FIGS. 1 to 7.

Firstly, a first example of a triple eccentricity butterfly valve 30 comprising a metal sealing system 6 conforming with the invention will be described with reference to FIGS. 1 to 6.

Figure 1:
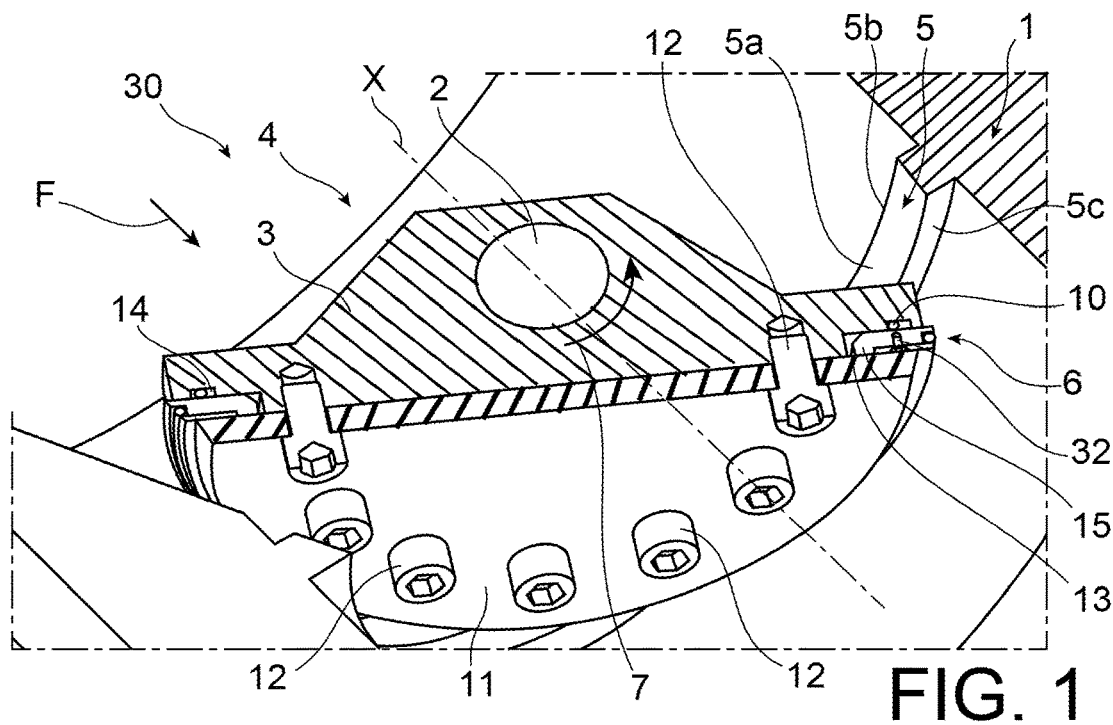
FIG. 1 is a perspective sectional view in a plane perpendicular to the axis of the control stem of the disk of a triple-eccentricity butterfly valve, illustrating an example of a metal sealing system conforming with the invention for a triple-eccentricity butterfly valve.

FIG. 1 is thus a sectional view illustrating the butterfly valve 30 in the open position, and the metal sealing system 6 in a plane perpendicular to the axis of the control rod of the disk 3.

Figure 2:
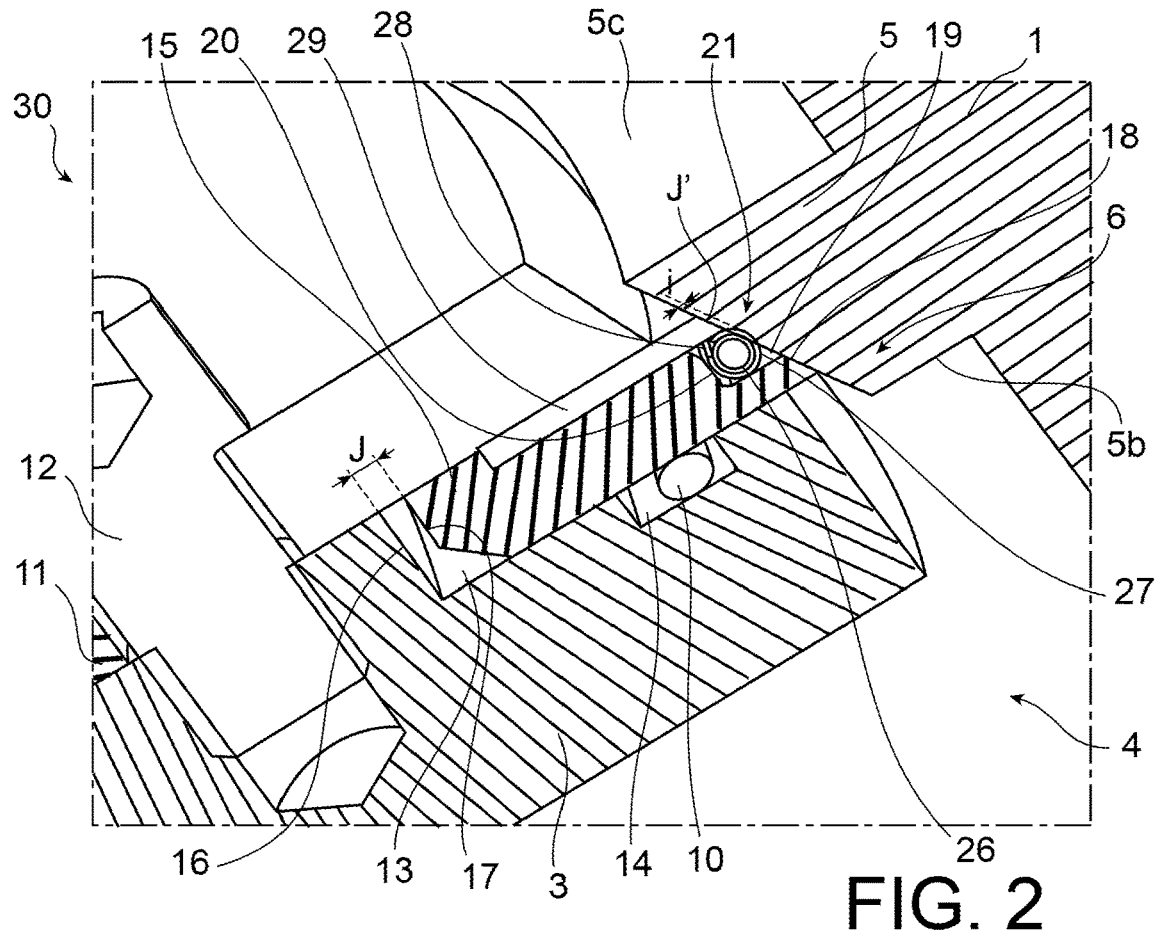
FIG. 2 and FIG. 3 are detailed sectional views in the plane of the valve control rod, illustrating the metal sealing system in FIG. 1 with the butterfly valve closed.
Figure 3:
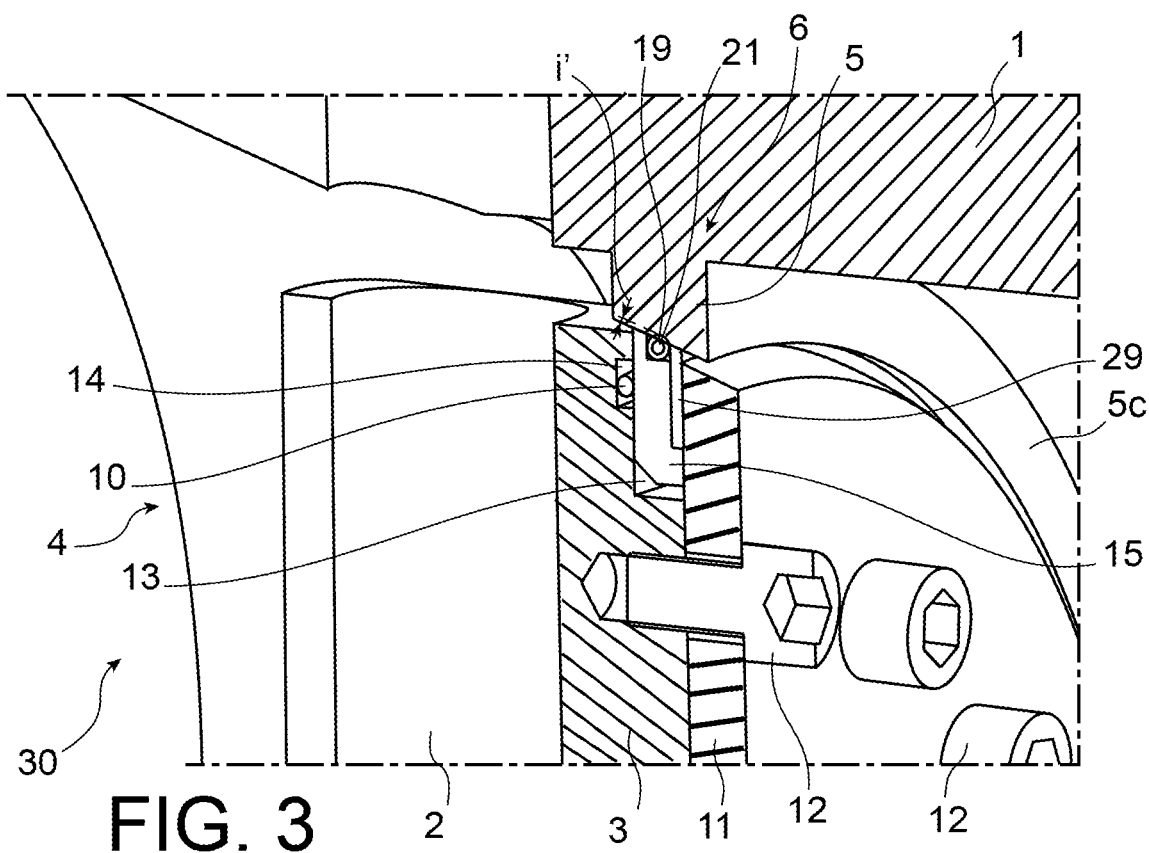

FIGS. 2 and 3 are detailed sectional views in the plane of the control rod of the butterfly valve 30 in the closed position.

The triple eccentricity butterfly valve 30 thus comprises a hollow valve body 1, that is hollowed out to define a conduit 4. Furthermore, at its internal periphery delimiting its hollow part, the valve body 1 comprises a conical and inclined internal annular part that forms the valve seat 5, visible for example in FIG. 1. In other words, the valve seat 5 comprises an internal surface 5a with an inclined conical shape.

This internal surface 5a extends between an upstream lateral face 5b and a downstream lateral face 5c of the valve seat 5. It should be noted that the terms "upstream" and "downstream" must be understood as being relative to the normal flow direction of the fluid from upstream to downstream, as represented by the arrow F in FIG. 1.

The upstream lateral surface 5b and the downstream lateral surface 5a are contained in planes perpendicular to the X axis of the conduit 4. Furthermore, if the valve seat 5 is intersected by a plane perpendicular to the X axis of the conduit 4 and is located between the two planes in which the lateral surfaces 5b and 5a are inscribed, the inner edge of valve seat 5 would be elliptical in shape.

The butterfly valve 30 also has a stem passage 2, into which the valve stem (not shown) will fit, that is guided in rotation on each side of the conduit 4, and is connected to a control rod of the butterfly valve 30. The butterfly valve 30 also comprises a disk 3 housed in the conduit 4 and through which the stem 2 passes, and will rotate simultaneously with the valve stem 2 in the direction indicated by the arrow 7 in FIG. 1.

Figure 6:
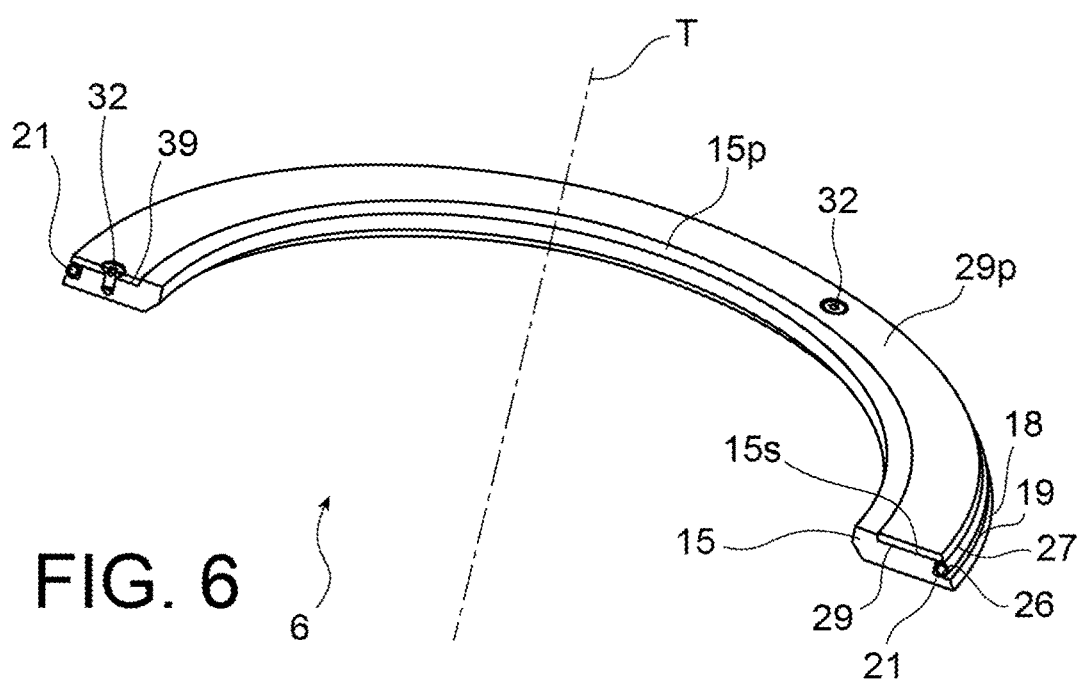
FIG. 6 is a perspective sectional view illustrating an example of a sealing system conforming with the invention comprising the metal case, the metal cover and the dynamic metal seal.

Furthermore, at its periphery, the disk 3 comprises a recess 13 for the integration of a sealing system 6 conforming with the invention as can be seen for example in FIG. 6, at the bottom of which a groove 14 is machined. Alternatively, if the metal sealing system 6 is installed on the valve body 1, the recess would be located on the valve body 1. Similarly, the groove could be formed in the valve body 1 if the metal sealing system 6 is installed in the valve body 1.

A secondary seal 10 is positioned in the groove 14, and the metal sealing system 6 then covers the secondary seal 10. The secondary seal 10 may for example be a spiral seal. It is designed to interrupt the leakage path between the metal sealing system 6 and the disk 3.

The assembly formed by the metal sealing system 6 and the secondary seal 10 is compressed axially by a flange 11, that is itself clamped by a network of nuts 12.

FIG. 2 shows a detailed view at 90° from the valve axis, showing the sealing system 6 on the disk 3 in the closed position.

The sealing system 6 thus comprises a case 15, adapted to be installed in the recess 13 formed in the disk 3. As shown in FIG. 2, there is a clearance J between the inside diameter 17 of the case 15 and the outside diameter 16 of the disk 3, in the recess 13, so that the assembly can position itself during the first closure.

The external surface 18 of the case 15 is has an inclined conical shape, with dimensions such that it is in uniform contact with the valve seat 5 at the end of the closure.

Furthermore, a first housing 19 is formed in the case 15. This first housing 19 comprises a lateral bearing surface 20, preferably parallel to the central axis T of the case 15, shown in FIG. 4. It should be noted that the two surfaces perpendicular to the central axis T of the case 15 are referred to as the "upper face" and the "lower face" of the case 15. By convention, the "upper face" is the surface closest to the top of the cone forming the external surface. Unlike a solid seal according to prior art, the first housing 19 would then be formed by removal of material on the upper surface or on the lower surface. In this case, the first housing 19 is formed on the upper face of the case 15, but it could be formed on the lower face without going outside the framework of the invention.

The first housing 19 is thus opened towards the exterior. If the case 15 is intersected on a plane containing the central axis T, a geometry similar to the geometry of a staircase is observed, intersecting the outer cone. The bottom 19f of the first housing 19 is preferably flat while the lateral bearing surface 20 is preferably parallel to the central axis T.

Figure 4:
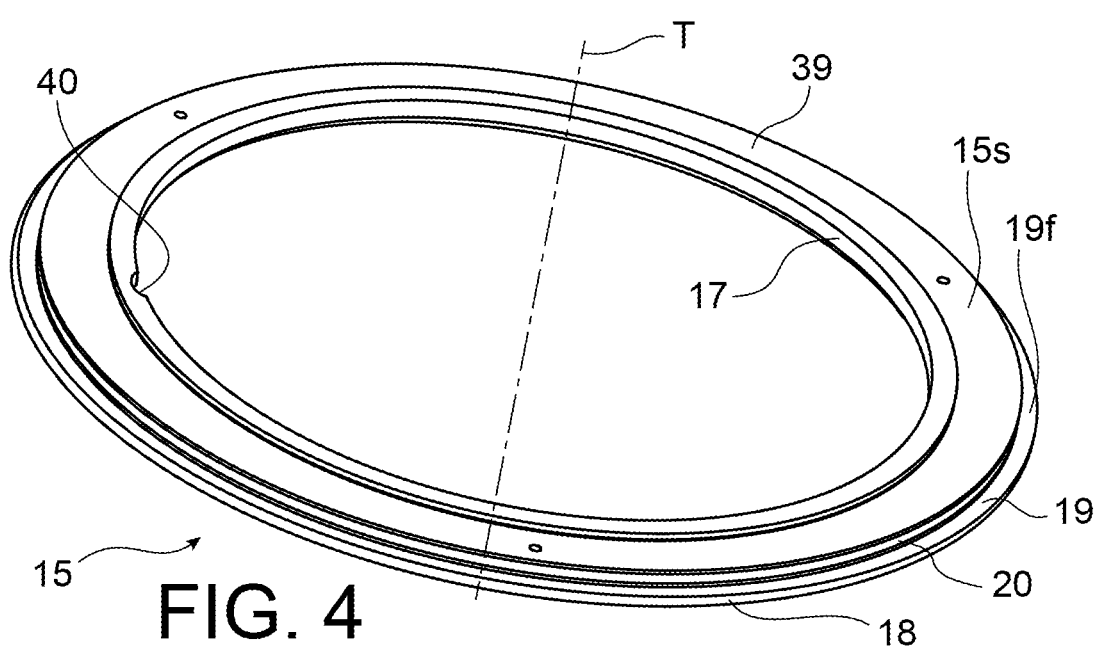
FIG. 4 and FIG. 5 are perspective and front views respectively, illustrating an example of a case of a sealing system conforming with the invention.

Furthermore, it should be noted that, as can be seen in FIG. 4, the case 15 incorporates an indexing system 40 so that it can be positioned at a correct angle on the disk 3, for example a notch for a pin on its inside diameter. In fact, the entire internal part of the case 15 is such that it can be positioned on the disk 3.

Thus, the case 15 is indexed in an angular position in the recess 13 by an axial pin fitted in the disk 3 and passing through the notch 40 in the case 15, this arrangement not being fully represented.

Figure 5:
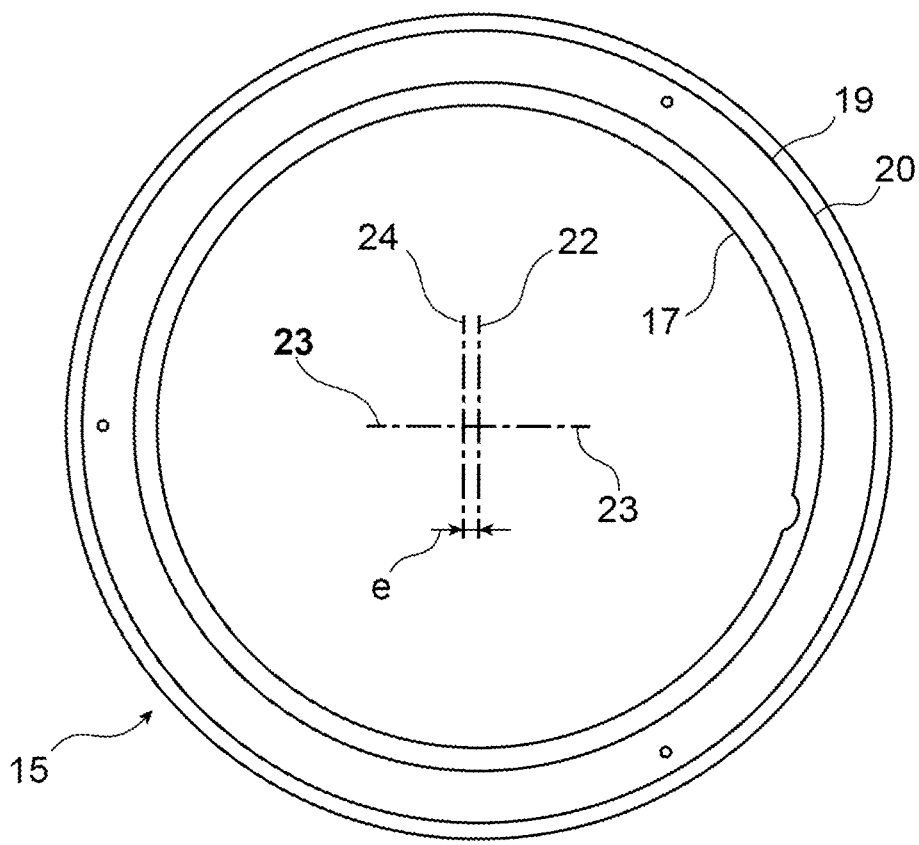

FIG. 5 represents a top view of the case 15. It is observed that the lateral bearing surface 20 is elliptical in shape with a major axis 23 and a minor axis 22. The major axis 23 is coincident with the horizontal median axis of the inside diameter 17 of the case 15. The minor axis 22 is parallel to the vertical median axis 24 of the inside diameter 17 of the case 15 with an offset equal to a value e.

Furthermore, a dynamic metal seal 21 is fitted in the first housing 19. It comprises a coil spring 26 and a coating 27. For example, it may be a simple "U" torus seal. It should be noted that the term "C" opening is used when the opening faces the inside or outside diameter of the case. When seen in a sectional view, in this case the opening is oriented towards the upper or lower face such that the term "U" opening is used. In other words, the position is at 90° from a "C" opening. This dynamic seal 21 has smooth parts on its inside and outside diameters, and can therefore make a radial seal when its inside and outside diameters come into contact.

For example, it may be a HELICOFLEX® seal marketed by the French Technetics Group company, the basic principle of which is described in the French patent application FR 2 151 186 A1. It can be noted that the difference in dimensions between the minor axis 22 and the major axis 23 is visually quite small. The seal 21 can be manufactured in circular form, and can then be stretched manually during installation in the first housing 19 to take its elliptical shape, being retained by the lateral bearing surface 20.

Once positioned in its first housing 19, the inner periphery of the dynamic seal 21 is in contact with the lateral bearing surface 20 or the vertical surface of the first housing 19. In a section on a plane containing the central axis T, the section of the outer periphery of the dynamic seal 21 intersects the dummy conical surface prolonging the actual conical surface that forms the outer shape of the case 15. The maximum penetration of the circle arc of the torus of the dynamic seal 21 into the cone, measured perpendicular to the surface of the cone, is referred to as "interference". When the valve 30 is closed, the sealing system 6 will move into position in contact with the valve seat 5 with an inclined conical shape made so that, at the end of the closing, its surface will be coincident with the inclined conical surface forming the outer shape of the case 15. The case 15 can act as a stop, if there are no stops elsewhere on the valve 30, and the interference will correspond to the effective compression of the dynamic seal 21 on the valve seat 5. As stated in the presentation of prior art, the conical surfaces of the case 15 and the valve seat 5 cannot match perfectly. However, this is not a problem because the seal is made by the interference of the dynamic seal 21 and not by a perfect fit of the two conical surfaces.

The coating 27 has a "U" shape. In the example described, the angle of the opening 28 of the "U" is very slightly offset inwards from its normal position, i.e. parallel to the central axis T of the case 15; therefore, it is certain that the ends of the coating 27 cannot catch the valve seat 5 during movements of the valve 30, which would damage the coating 27. Regardless of the exact position of the opening 28, it is important that it does not intersect the outside and inside diameters of the seal under any circumstances, since the seal will be made at these diameters.

Furthermore, a cover 29 closes the metal sealing system 6 by flush fitting, or with a substantially continuous surface, between the upper surface 29p of the cover 29 and the upper surface 15p of the metal case 15 so that the sealing system 6 can be positioned in contact with the flange 11. This cover 29 is advantageously positioned in a second housing 39 in the case 15, formed in this case by a cut-out 15s in the upper face 15p of the case 15 (but it could also be the lower face). In addition, the cover 29 is held in place by three axial screws 32, visible in FIGS. 1 and 6. These screws 32 must be capable of holding the cover 29 in place during transport and assembly of the sealing system 6. Finally, the assembly is held in place on the valve 30 by the flange 11 and the nuts 12. In other words, the sealing system 6 forms an assembly comprising the seal 21 between the case 15 and the cover 29 that is homogeneous and independent of the flange 11. The presence of the cover 29 in a second housing 39 of the case 15, designed such that the upper face of the sealing system 6 is formed by the cover 29 and a part of the case 15, advantageously facilitates handling of the sealing system 6 and makes the assembly easier. In addition, any maintenance operation, and particularly replacement of the seal 21, is made easier by the use of this cover 29.

The external shape of the cover 29 is inclined and conical. The angle between the cover 29 and the case 15 is indexed. After assembly, the inclined conical area forming the outside of the cover 29 replaces the equivalent inclined conical area of a conventional plain metal seal that was removed from the same location when creating the first housing 19 for the dynamic seal 21.

Furthermore, a clearance J' is formed between the outside of the cover 29 and the valve seat 5. Furthermore the cover 29 never comes into contact with the valve seat 5. Advantageously, given its small thickness, this avoids the risk of twisting the cover 29 when the valve 30 is closed. When closing, the radial compression of dynamic seal 21 will be made as a result of the interference i between the periphery of the seal 21 and the valve seat 5.

In FIG. 3, that shows a sectional view similar to that in FIG. 2 but in a plane containing the centre line of the valve, not shown, there is also interference i' of the seal 21. In one preferred embodiment, an expert in the subject will be able to determine the lengths of the major axis 23 and the minor axis 22, and the offset e, so as to create a uniform interference of the dynamic seal 21 with the valve seat 5 around the entire periphery of the sealing system 6 so as to obtain i=i'. However, the length of the minor axis 22 can be reduced so as to obtain i<i'. This may be useful for reducing operating torques and torsion forces on the coating 27 at the stem, and therefore making a consequential limitation of wear of the coating 27. In general, an expert in the subject can modify all or part of the shape of the bearing surface 20 to manage interference locally.

During assembly, the metal sealing system 6 thus defined is positioned on the disk 3 in the same way as a solid metal seal that it replaces. It comes into contact with the secondary seal 10, preventing the leak around itself, and the assembly is compressed by the flange 11.

It should be noted that the inclined conical area of the cover 29 is preferably positioned to be slightly set back from the equivalent inclined conical area of a conventional plain seal. This enables optimum retention of the dynamic seal 21 in the first housing 19, without obtaining contact between the valve seat 5 and the cover 29 when closing. Such contact would not contribute to the seal, but would create mechanical stresses on the cover 29, that could damage it.

Furthermore, the ellipse formed by the lateral bearing surface 20 of the first housing 19 is defined such that the effective interference of the dynamic seal 21 is identical around the entire periphery of the sealing system 6. Specifically, this is achieved by optimising the dimensions of the major and minor axes. The centre of the ellipse is also adjusted in position on the line collinear with its own major axis.

Furthermore, interference around the perimeter of the sealing system 6 can be variable. To achieve this, this lateral bearing surface 20 of the first elliptical housing 19 should be reconsidered, and should also be defined as having an arbitrary shape. It can then be defined as desired to obtain a specific interference of the dynamic seal 21 at each cardinal point of the sealing system 6. This has several advantages: for example, it may be useful to limit interference in areas close to the axis so as to limit the closing torque of the valve 30. These areas are also the areas in which the material of the dynamic seal 21 is stressed in torsion, which reduces its potential life. As explained in the state of prior art, interference will become manifest at the time of closure in these areas close to the control axis and will therefore generate a resistive torque and torsion at the surface of the dynamic seal 21. However, these areas are also the areas in which the dynamic seal 21/valve seat 5 interference is most easily controlled, in terms of the precision of the dimensions and the positioning between the sealing system 6 and the valve seat 5. Therefore it would be possible to reduce it locally in these areas. In this specific case, a bearing surface 20 of the elliptically shaped dynamic seal 21 can be retained, but the minor axis of which is reduced to reduce interference in areas close to the axis. The bearing surface 20 can also be made as follows: an elliptically shaped bearing surface is taken as the base giving interference with uniform compression. This ellipse is then intersected by lines parallel to the major axis. This reduces interference at stem passages.

One improvement may consist of creating a complete spring 26, by welding several free lengths of springs. The turn diameter is the same for all free lengths. However, the diameter of the spring wire and/or the wire material may be different. Therefore the stiffness of each free length will be different, making it possible to have different local mechanical behaviours. Obviously, areas with different stiffnesses should be identified so that each can be positioned at its corresponding location when installing the assembly.

Figure 7:
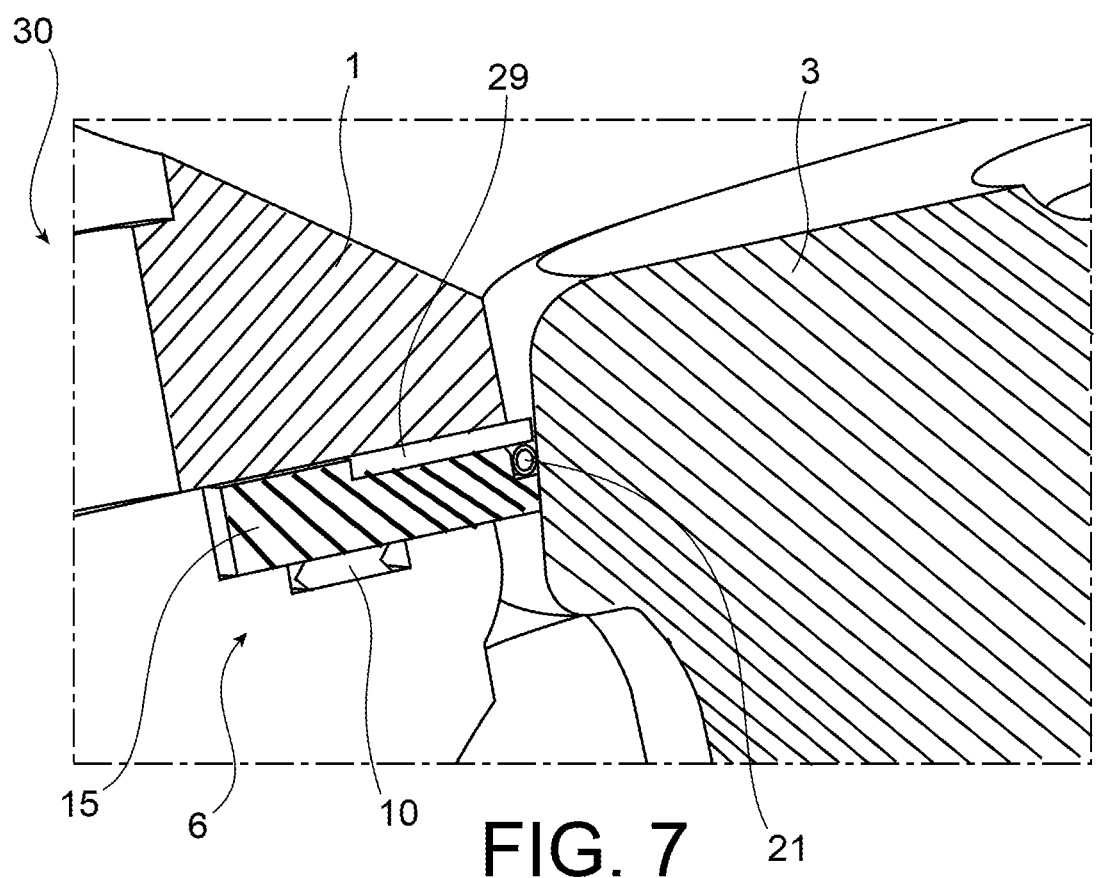
FIG. 7 is a detailed sectional view, illustrating a variant embodiment of the metal sealing system conforming with the invention.

Furthermore, FIG. 7 shows a version of the invention with an "inverted" configuration, in other words the sealing system 6 is mounted in the valve body 1, coming into contact with a valve seat formed by the outer surface of the disk 3. It should be noted that in this case the secondary seal 10 is a spiral seal and not an O-ring. The invention is not restricted to a particular type of secondary seal.

Obviously, the invention is not limited to the example embodiments that have just been described. An expert in the subject can make various modifications to it.

The invention claimed is:

1. A metal sealing system for a triple eccentricity butterfly valve comprising:
   a dynamic metal seal, comprising a metal core surrounded by an external coating;
   a metal case with an inclined conical external surface, the metal case including a first housing inside which the dynamic metal seal is mounted, and including a second housing formed as a cut-out in an upper or lower surface of the metal case; and
   a metal cover, attached to the metal case to allow the metal case to close by flush fitting of the upper face or lower face of the metal cover with a respective upper face or lower face of the metal case,
   wherein the metal cover is positioned within the cut-out of the metal case and extends along a portion of the first housing and is positioned adjacent the metal seal positioned inside the first housing, and
   wherein the dynamic metal seal is located between the metal cover and the surface of the metal case defining the first housing.

2. The metal sealing system according to claim 1, wherein the metal core is composed of a coil spring with adjacent turns that is closed on itself and that has the shape of a torus when in the rest state.

3. The metal sealing system according to claim 2, wherein the external coating inside which the metal core is inserted, has the shape of a toroidal surface for which the generating circle does not close on itself, when in the rest state.

4. The metal sealing system according to claim 1, wherein the first housing of the metal case comprises a lateral bearing surface with which the dynamic metal seal is positioned in contact, the lateral bearing surface having a non-circular shape, configured to obtain a variable interference around the periphery of the sealing system.

5. The metal sealing system according to claim 4, wherein the lateral bearing surface is elliptical in shape.

6. The metal sealing system according to claim 5, wherein the dynamic metal seal is circular in shape and can be radially compressed to take on an elliptical shape.

7. The metal sealing system according to claim 1, wherein the dynamic metal seal is a "U" shaped seal, with an opening facing the upper or lower face of the case.

8. The metal sealing system according to claim 1, wherein the metal sealing system is configured to be fitted in a disk or in a valve body, of a triple eccentricity butterfly valve comprising a valve body defining a conduit, and comprising an inclined conical part forming a valve seat, a valve stem guided in rotation on each side of the conduit, connected to a control rod of the butterfly valve, and a disk rotating simultaneously with the valve stem, the metal sealing system bearing on a secondary seal, crushing it to make the seal between the metal sealing system and the disk or the valve body, and of which an external or internal inclined conical section respectively provides the seal with the valve seat or the disk respectively, and said case being in contact with the secondary seal.

9. The metal sealing system according to claim 8, wherein the metal sealing system is configured to be installed in a recess in the disk or in a recess in the valve body.

10. The metal sealing system according to claim 8, wherein the metal sealing system is configured to be fitted in the disk, and wherein the metal sealing system and the secondary seal are configured to be compressed axially by a flange, attached to the disk by a network of nuts.

* * * * *